US008046538B1

(12) United States Patent
Stenstrom

(10) Patent No.: US 8,046,538 B1
(45) Date of Patent: Oct. 25, 2011

(54) METHOD AND MECHANISM FOR CACHE COMPACTION AND BANDWIDTH REDUCTION

(75) Inventor: Per O. Stenstrom, Gothenburg (SE)

(73) Assignee: Oracle America, Inc., Redwood City, CA (US)

( * ) Notice: Subject to any disclaimer, the term of this patent is extended or adjusted under 35 U.S.C. 154(b) by 335 days.

(21) Appl. No.: 11/197,214

(22) Filed: Aug. 4, 2005

(51) Int. Cl.
*G06F 12/00* (2006.01)
*G06F 12/08* (2006.01)

(52) U.S. Cl. ........ 711/119; 711/117; 711/118; 711/122; 711/133; 711/154; 711/156; 711/159

(58) Field of Classification Search ............... 711/118, 711/119, 122, 144, 117, 133, 154, 156, 159
See application file for complete search history.

(56) References Cited

U.S. PATENT DOCUMENTS

| | | | | |
|---|---|---|---|---|
| 4,774,654 | A * | 9/1988 | Pomerene et al. ........... | 711/122 |
| 5,835,929 | A * | 11/1998 | Gaskins et al. .............. | 711/3 |
| 6,078,992 | A * | 6/2000 | Hum ........................ | 711/122 |
| 6,584,546 | B2 * | 6/2003 | Kavipurapu ................ | 711/120 |
| 2003/0005226 | A1 * | 1/2003 | Hong ....................... | 711/119 |
| 2003/0120866 | A1 * | 6/2003 | Stoutamire ................. | 711/118 |
| 2004/0128463 | A1 * | 7/2004 | Kim et al. .................. | 711/170 |
| 2005/0091456 | A1 * | 4/2005 | Huck ........................ | 711/118 |
| 2010/0235576 | A1 * | 9/2010 | Guthrie et al. .............. | 711/122 |
| 2010/0262778 | A1 * | 10/2010 | Cargnoni et al. ............ | 711/118 |

OTHER PUBLICATIONS

Dubois, et al., "The Detection and Elimination of Useless Misses in Multiprocessors", USC Technical Report No. CENG 93-02, Department of Electrical Engineering-Systems, University of Southern California, Los Angeles, CA and Department of Computer Engineering, Lund University, Lund Sweden, To appear in the 1993 International Symp. on Computer Architecture, 27 pages.

(Continued)

*Primary Examiner* — Sanjiv Shah
*Assistant Examiner* — Samuel Dillon
(74) *Attorney, Agent, or Firm* — Roy D. Rankin; Meyertons, Hood, Kivlin, Kowert & Goetzel, P.C.

(57) ABSTRACT

A method and mechanism are managing caches. A cache is configured to store blocks of data based upon predictions of future accesses. Each block is partitioned into sub-blocks, and if it is predicted a given sub-block is unlikely to be accessed, the sub-block may not be stored in the cache. Associated with each block is a mask which indicates whether sub-blocks of the block are likely to be accessed. When a block is first loaded into the cache, the corresponding mask is cleared and an indication is set for the block to indicate a training mode for the block. Access patterns of the block are then monitored and stored in the mask. If a given sub-block is accessed a predetermined number of times, a bit in the mask is set to indicate that the sub-block is likely to be accessed. When a block is evicted from the cache, the mask is also transferred for storage and only the sub-blocks identified by the mask as being likely to be accessed may be transferred for storage. If previously evicted data is restored to the cache, a previously stored mask is accessed to determine which of the sub-blocks are predicted likely to be accessed. The lower level storage may then transfer only those sub-blocks predicted likely to be accessed to the cache.

15 Claims, 7 Drawing Sheets

OTHER PUBLICATIONS

Alameldeen, et al., "Adaptive Cache Compression for High-Performance Processors", Computer Sciences Department, University of Wisconsin-Madison, Appears in the proceedings of the 31st Annual International Symposium on Computer Architecture (ISCA-31), Munich, Germany, Jun. 19-23, 2004, 12 pages.

Seznec, Andre, "Decoupled Sectored Caches", IRISA-INRIA, Campus de Beaulieu, Rennes Cedex, France, http://www.irisa.fr/caps, This paper appears in IEEE Transactions on Computers, Feb. 1997, 14 pages.

Hallnor, et al., "A Compressed Memory Hierarchy Using an Indirect Index Cache", Advanced Computer Architecture Laboratory, EECS Department, University of Michigan, Ann Arbor, MI, 2004, 7 pages.

Spracklen, et al., "Chip Multithreading: Opportunities and Challenges", Scalable Systems Group, Sun Microsystems, Inc., Sunnyvale, CA, Proceedings of the 11th International Symposium on High-Performance Computer Architecture (HPCA-11 2005, 5 pages.

Jalminger, et al., "Improvement of Energy-Efficiency in Off-Chip Caches by Selective Prefetching", Technical Report 00-15, Chalmers University of Technology, Department of Computer Engineering, Goteborg, 2000, 18 pages.

* cited by examiner

METHOD AND MECHANISM FOR CACHE COMPACTION AND BANDWIDTH REDUCTION

BACKGROUND OF THE INVENTION

1. Field of the Invention

This invention is related to the field of computer systems and, more particularly, to memory systems in computer systems.

2. Description of the Related Art

Traditionally, the cost, performance, and power consumption characteristics of computer systems have been driven by the processors included in the system. More recently, however, trends in processor design have begun to shift attention to the main memory system. For example, chip multithreading (CMT) is becoming a more popular processor design. A CMT processor includes hardware on a single chip to concurrently process multiple independent software threads. The processor hardware may be shared among the threads, improving efficiency in the use of the processor hardware. However, having multiple threads in execution increases the demands on the memory system. While threads may be related to the same overall application and may share memory, in general each thread may have its own memory locations that it is accessing for instruction fetches and data. Thus, for the same number of processor chips as a non-multithreaded processor, more memory may be required to provide reasonable performance. As another example, chip multiprocessing (CMP) is becoming popular in which multiple independent processors are included on the same processor chip. Again, memory requirements may increase on a per processor chip basis.

Generally speaking, a larger main memory system translates to increased costs. First, the number of memory chips is increased, which clearly drives the cost up. Second, to provide an appropriate level of performance with a larger memory size (in terms of latency and bandwidth, for example), expensive implementation techniques may be required. For example, multiple memory controllers coupled to sections of the overall main memory may be required, additional banks of memory coupled to a given memory controller may be required, etc. Third, providing low latency, high bandwidth access to a large main memory may result in increased power consumption of the memory system (as compared to traditionally-sized memory systems). The increased power consumption may increase cooling requirements and power supply requirements for the computer system, which may also increase cost.

In addition, while new multi-core CMT and CMP processor chips may promise a high compute bandwidth, the requirement that bandwidth in and out of the chip scale linearly with the number of cores may severely constrain future systems. Consequently, the off-chip bandwidth may ultimately constrain CMT/CMP chips as the cache capacity on-chip will likely not be able to scale with the number of cores. As a result, techniques that can reduce bandwidth needs across the chip boundary become important.

One approach to dealing with this bandwidth bottleneck due to cache misses is to increase the amount of on-chip cache. However, increasing the size of on-chip caches reduces the area which can be devoted to processing cores.

Another approach involves partitioning a cache block frame into sub-blocks and associating a valid bit with each of the sub-blocks. On a cache miss, only the missing sub-block is loaded into the cache. Other approaches have sought to keep track of valid bits at the word level to reduce coherence transactions caused by false sharing. However, such approaches do not predict future accesses and do not avoid future misses.

Another approach is to compress off-chip traffic in order to minimize the bandwidth required to perform writeback operations. While compression of the on-chip caches may improve performance, additional latencies may be introduced due to the decompression overhead which is required.

What is desired are methods and mechanisms that can effectively reduce bandwidth and reduce misses.

SUMMARY

Methods and mechanisms for cache management are contemplated.

A method and mechanism are contemplated for storing blocks in a cache based on the prediction of future accesses. In one embodiment, each block stored in the cache is partitioned into sub-blocks. If it is predicted that a given sub-block is unlikely to be accessed while the corresponding block is resident in the cache, the sub-block may not be stored in the cache.

In one embodiment, each block of data stored in the cache has an associated mask with entries configured to indicate whether a corresponding sub-block of a block is likely to be accessed while the block is present in the cache. In one embodiment, when a block of data is first loaded into the cache, the entire block of data is loaded into the cache, the corresponding mask is cleared, and an indication is set for the block to indicate a training mode for the block. While the block is resident in the cache, access patterns to the block data are monitored and stored in the corresponding mask. If a given sub-block is accessed a predetermined number of times, a bit in the mask is set to indicate that the sub-block is likely to be accessed while the corresponding block is resident in the cache.

When a data block is evicted from the cache to a lower level of the memory hierarchy, the corresponding mask is also transferred for storage. In one embodiment, only the sub-blocks identified by the mask as being likely to be accessed are transferred for storage. Subsequently, if the evicted data is restored to the cache, the lower level storage may access the stored mask to determine which of the sub-blocks are predicted likely to be accessed. The lower level entity may then transfer only those sub-blocks predicted likely to be accessed to the cache.

These and other embodiments will become apparent upon reference to the following description and accompanying drawings.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Figure 1:
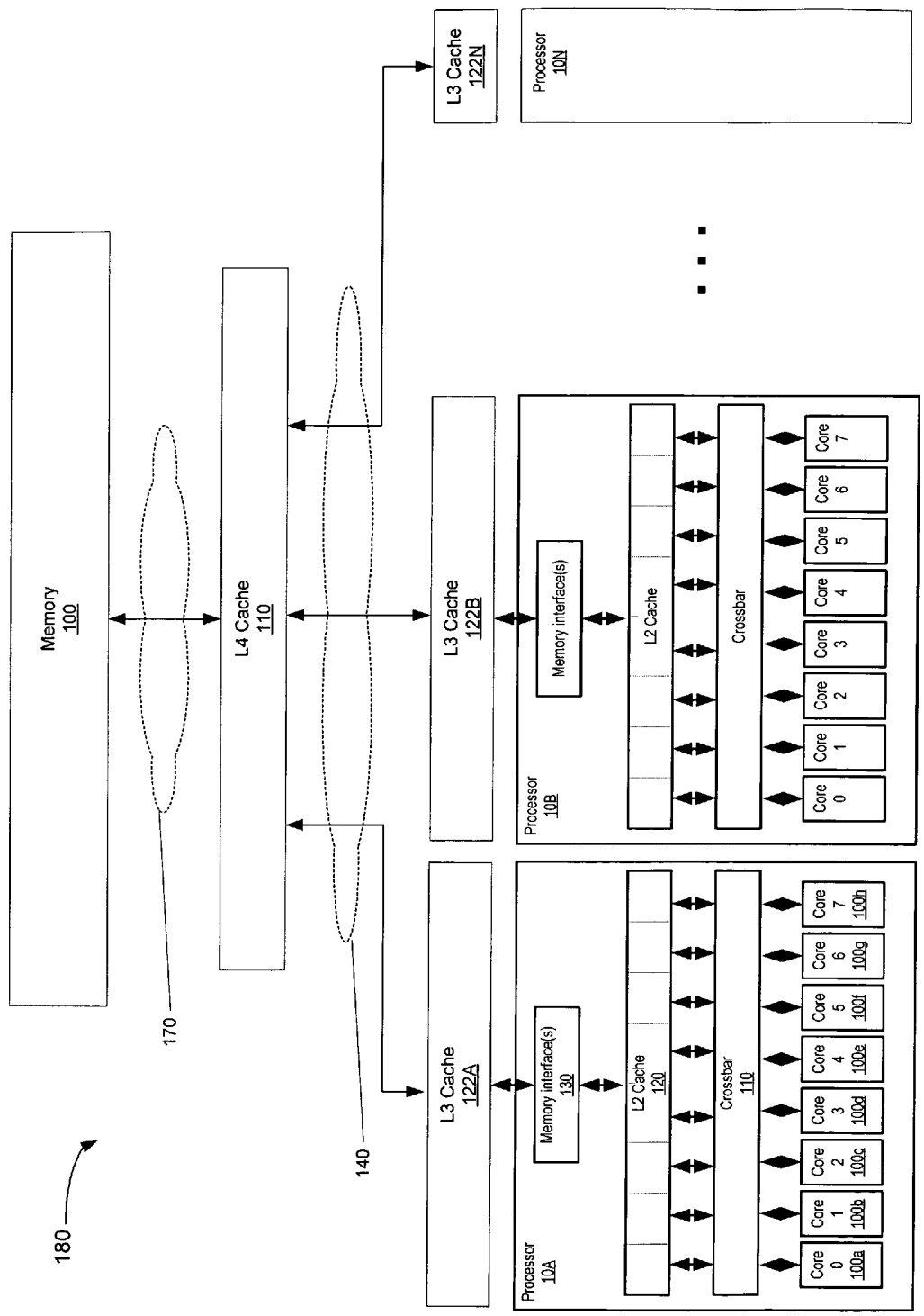
FIG. 1 depicts one embodiment of a computing system.

FIG. 1 depicts one embodiment of a shared memory computing system 180. In the embodiment shown, system 180 includes multiple processors 10A-10N. As shown, processor 10A comprises a plurality of processing cores 100*a-h*, which are also designated "core 0" through "core 7". Each of cores 100 is coupled to a level 2 (L2) cache 120 via a crossbar 110. L2 cache 120 is coupled to one or more memory interface(s) 130. In addition, each processor 10 is coupled to a level 3(L3) cache 122A-N. Each L3 cache 122 is coupled in turn to a level 4(L4) cache 110 via interconnect(s) 140. Finally, the L4 cache 110 is coupled to a shared system memory 100 via interconnect(s) 170. Interconnects 140 and 170 may comprise point-to-point based, bus based, or other types of interconnects known in the art. In one embodiment, each of processors 10 is similarly configured, though embodiments which include differently configured processors are contemplated as well. Elements referred to herein with a particular reference number followed by a letter may be collectively referred to by the reference number alone. For example, processors 10A-10N may be collectively referred to as processors 10. It is noted that while FIG. 1 depicts L2 cache 120 as being on-chip and L3 cache 122 as being off-chip, other embodiments may have the L3 cache 122 on-chip and an L4 chip off-cache, and so on.

As will be discussed further below, in one embodiment, the L2 caches 120 and L3 caches 122 of system 180 are configured such that predictions are made as to which sub-blocks of a cache block are likely to be accessed. Based upon such predictions, only those sub-blocks which are deemed likely to be accessed by a given processor 10 are fetched from an L3 cache 122 to a corresponding L2 cache 120 in response to an L2 cache 120 miss. In this manner, the bandwidth between the L2 cache 120 and L3 cache 122 may be reduced. Further, by loading blocks which are more likely to be accessed, misses in the L2 cache 120 may be reduced as well. Finally, in various embodiments, data within the L2 cache 120 may be stored in a compact form.

Figure 2:
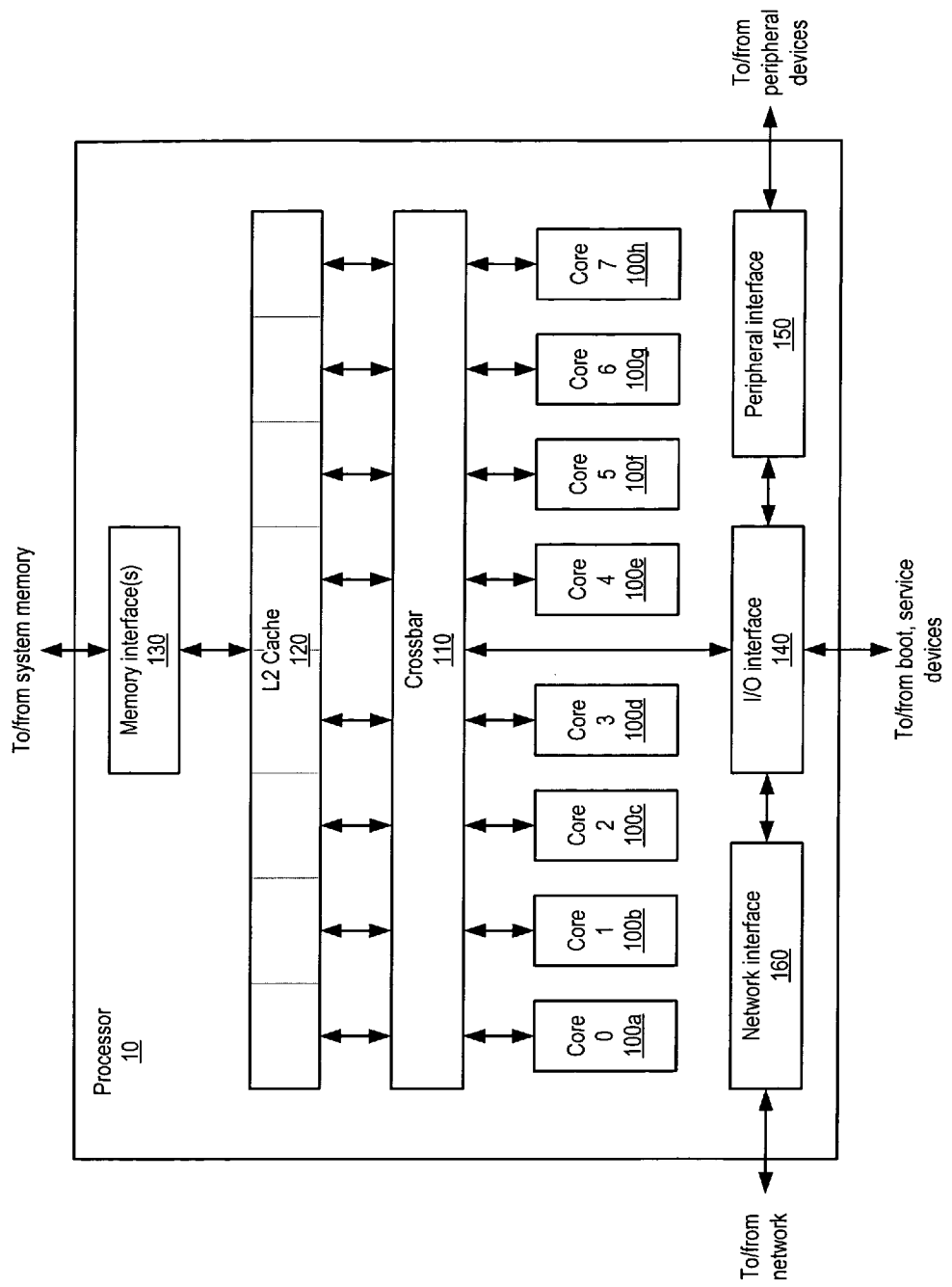
FIG. 2 is a block diagram illustrating one embodiment of a multi-threaded multi-core processor.
Figure 3:
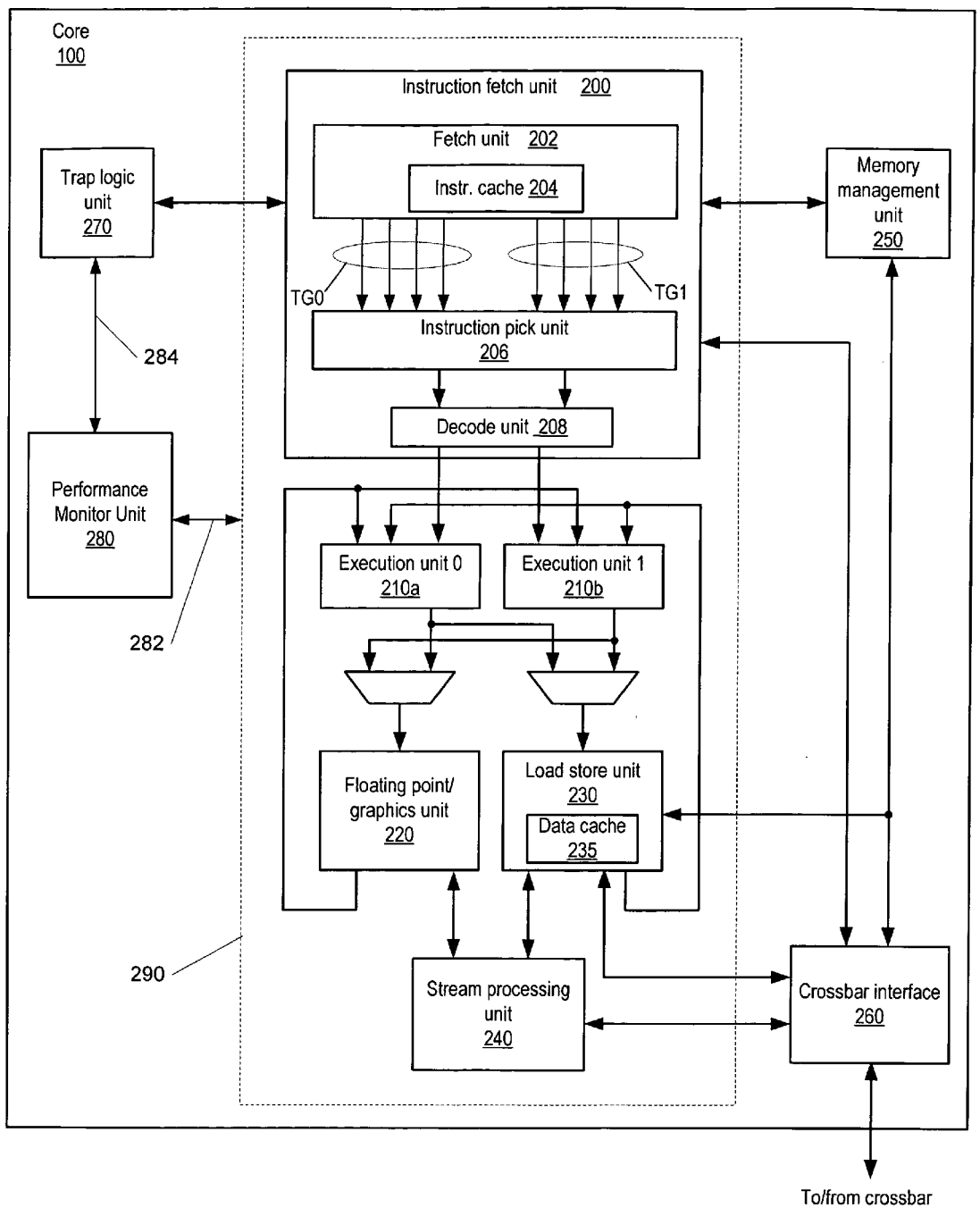
FIG. 3 is a block diagram illustrating one embodiment of a processing core.

Turning now to FIG. 2 and FIG. 3, a more detailed description of a processor 10 and core 100 as depicted in FIG. 1 is provided. In the illustrated embodiment, processor 10 includes a plurality of processor cores 100*a-h*, which are also designated "core 0" through "core 7". Each of cores 100 is coupled to an L2 cache 120 via a crossbar 110. L2 cache 120 is coupled to one or more memory interface(s) 130. Additionally, crossbar 110 couples cores 100 to input/output (I/O) interface 140, which is in turn coupled to a peripheral interface 150 and a network interface 160. As described in greater detail below, I/O interface 140, peripheral interface 150, and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86 compatible ISAs, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, as described below, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multi-threaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any of the cores 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus DRAM (RDRAM), for example. (Rambus and RDRAM are registered trademarks of Rambus Inc.). In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

FIG. 3 illustrates one embodiment of core 100 which is configured to perform fine-grained multithreading. In the illustrated embodiment, core 100 includes an instruction fetch unit (IFU) 200 coupled to a memory management unit (MMU) 250, a crossbar interface 260, a trap logic unit (TLU) 270, a performance monitor unit (PMU) 280, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1. PMU 280 is coupled to TLU 270 and is further coupled to one or more of the units encompassed within block 290.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement an instruction buffer for each thread wherein several recently fetched instructions corresponding to a given thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1. For example, if core 100 implements eight threads, then each of thread groups TG0 and TG1 may include four threads. Alternative numbers of threads and groupings are possible and are contemplated.

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 215 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Rivest Cipher 4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands from FGU 220 or LSU 230, to freely schedule operations across its various algorithmic subunits and to signal FGU 220 or LSU 230 when a given result is ready to be written back or stored. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate processing of the result (for example, by using dedicated control registers to convey results).

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a round-robin or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 208 may not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode or hypervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Figure 4:
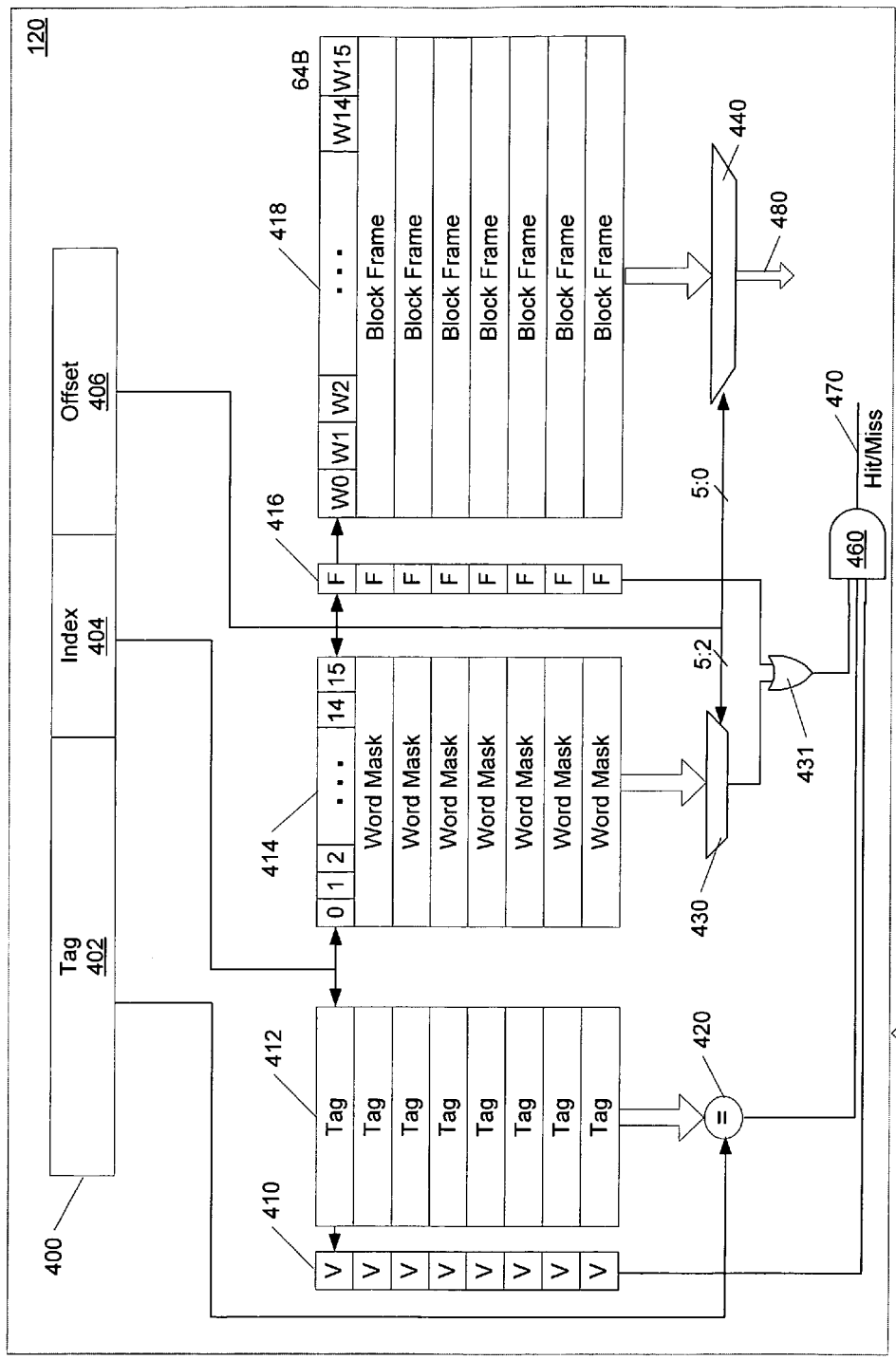
FIG. 4 is a block diagram illustrating one embodiment of a level 2 cache.

As discussed above, in one embodiment, the processor L2 cache and corresponding L3 cache may be configured to transfer data based upon predictions as to what data is likely to be accessed. FIG. 4 depicts one embodiment of a portion of an L2 cache 120 as shown in FIG. 1 and FIG. 2. For ease of illustration and discussion, the embodiment of FIG. 4 illustrates a direct mapped cache. However, those skilled in the art will appreciate that the methods and mechanisms described herein are equally applicable to associative and other types of caches as well.

FIG. 4 depicts one embodiment of a memory address 400 which may be used to access the L2 cache. In the example shown, the address 400 includes bits which may correspond to a Tag 402, an Index 404, and an Offset 406. Other embodiments are possible and are contemplated. As shown, the cache includes a plurality of Tags 412, each of which is associated with a corresponding data block frame 418. Also associated with each Tag 412 is a Valid bit (V) 410 which may be used to indicate whether the corresponding entry stores valid data. Also associated with each Tag 412 and block frame 418 is a word mask 414 and status bit "F" 416. In one embodiment, each block frame 418 is configured to store up to 64 Bytes of data which may generally represent a size of a fetch unit in the processor (e.g., a cache line or block). However, capacities other than 64 Bytes are contemplated as well.

In the embodiment shown, each block frame 418 is partitioned into a plurality of sub-blocks W0-W15. For example, each sub-block may correspond to a word size of the corresponding processor. If the processor has a word size of 32 bits, then each block frame 418 may be partitioned into sixteen sub-blocks of 4 Bytes each. Associated with each block frame 418 is a word mask 414 which includes a bit for each sub-block in the corresponding block frame 418. Therefore, in an embodiment wherein the block frame is partitioned into sixteen sub-blocks, the corresponding word mask 414 would include sixteen bits—one for each of the sub-blocks. Additional status and other bits may be included in, or associated with, the word mask 414 as well.

Generally speaking, the cache depicted in FIG. 4 is configured such that fewer than all sub-blocks of a given block may be stored in a block frame at any given time. In particular, a given block frame may store data within the block frame on a sub-block basis. In such a case, the word mask 414 corresponding to the block frame 418 may identify which of the sub-blocks of the corresponding block frame are currently stored within the frame. For example, the word mask may have a set bit for each of those sub-blocks which represent valid data, and the word mask may have a cleared bit for each sub-block which does not represent valid data.

In one embodiment, when data corresponding to a given address is first loaded into the L2 cache 120, a block frame entry 418 of the cache is allocated for storage of the data and an entire block of data corresponding to the address is stored in the allocated entry. In addition, the address tag is stored in a corresponding tag entry 412 and the corresponding valid bit (V) 410 is set to indicate the entry is storing valid data. In addition, all bits of the word mask 414 for the corresponding entry are cleared and the corresponding "F" bit 416 is set to indicate the newly loaded data has no associated sub-block predictions available. In various embodiment, sub-block predictions may be unavailable because none have been previously developed. Alternatively, sub-block predictions may be unavailable because previously developed predictions have been lost. In addition, a set F bit 416 may also serve to indicate that all sub-blocks of the corresponding data are valid.

In one embodiment, when the F bit 416 is set, the L2 cache 120 may enter a training mode in order to create a word mask 414 for the corresponding data. During a training mode, when a particular sub-block is accessed for an entry in which the F bit 416 is set, the bit in the word mask 414 which corresponds to the accessed sub-block may be set. In one embodiment, setting a bit in the word mask may be responsive to any access (e.g., even a single access). Alternatively, setting a bit in the word mask may be in response to detecting a predetermined number of accesses (e.g., a threshold) to a given sub-block while in training mode. For example, the predetermined number of accesses could be programmable during system initialization or during a configuration cycle. In one embodiment, once a particular bit of a word mask is set during training mode, the bit remains set.

In addition to the above, when the F bit 416 is set and the cache is in a training mode for the corresponding entry, all sub-blocks of a given block frame are storing valid data. Therefore, when a read access to the L2 cache 120 occurs, a set F bit 416 may obviate the need to determine whether the sub-block being accessed is actually present in the L2 cache 120. For example, in response to an L2 cache access, an address 400 is received. In the embodiment shown, the index 404 may be used to select a particular entry in the cache. The Tag 412 stored within the selected entry may be conveyed for comparison to the tag 402 of the received address 400 by comparator 420. Logic (e.g., logic AND gate 460) may receive the result of the comparison 420, as well as the corresponding valid V bit 410. If the F bit 416 for the selected entry is set (indicating all of the corresponding sub-blocks are valid), the output from the logic OR gate 431 is asserted and logic AND gate 460 may be asserted to indicate a cache Hit. In addition, data from the selected block frame 418 may be conveyed to multiplexor 440, where the Offset 406 is used to select the addressed data for conveyance via bus 480.

In one embodiment, when an entry is evicted or otherwise displaced from the L2 cache 120 for storage in a lower level of the cache hierarchy (e.g., for storage in the L3 cache 122), the word mask 414 corresponding to the evicted data is also conveyed for storage in the L3 cache 122. As described above, during its residency in the L2 cache 120, the word mask may have had bits set during a training mode. Consequently, the bits of the word mask may reflect some history of the sub-blocks while in the L2 cache 120. If the entry is then subsequently re-loaded from the L3 cache 122, the associated word mask is also loaded as well. As will be discussed further below, the word mask may also be used by the L3 cache 122 to selectively convey sub-blocks of the block frame to the L2 cache 120. For example, in one embodiment, the L3 cache 122 may only convey those sub-blocks of a block frame which have a corresponding bit in the word mask set. Such sub-blocks may be "predicted" to be those which will actually be accessed during residence in the L2 cache 120.

When the L2 cache 120 re-loads data from the L3 cache 122, the received data may further include an indication that the corresponding word mask 414 is valid. In response, the F bit 416 of the corresponding entry in the L2 cache 120 is cleared to indicate that fewer than all of the sub-blocks of the block frame may be resident in the corresponding block frame 418. Accordingly, the associated word mask 414 may be used to identify which of the sub-blocks are validly present. Assuming an L2 cache read access similar to that described above, an address 400 is received for use in accessing the cache 120. As before, the tag comparison 420 may be made and the valid bit 410 checked. However, in this scenario, the corresponding F bit 416 for the selected entry is cleared. Therefore, the output from the logic OR gate 431 is not asserted responsive to the F bit 416. Rather, the assertion of the output from the logic OR gate 431 will depend upon the output from multiplexor 430. In one embodiment, the contents of the word mask 414 corresponding to the selected entry are conveyed to multiplexor 430. Selected bits of the Offset 406 are then used to select one of the word mask bits for conveyance from the multiplexor 430. For example, if a block frame is configured to store 64 bytes of data, a cache access is directed to a particular byte of data, and a sub-block comprises four bytes, then the third through sixth least significant bits (i.e., bits 2-5) of the offset 406 may be used to select one of the sixteen word mask bits for conveyance via multiplexor 430. If the word mask bit is set, indicating the corresponding sub-block is present, the output of logic OR gate 431 will be asserted and logic AND gate 470 will signal a HIT.

In the event the data corresponding to an L2 cache entry is evicted, the F bit 416 may be used again to determine which sub-blocks are conveyed. In the example eviction above, the F bit 416 was set which indicated that all sub-blocks of the corresponding block frame were storing valid data. In such a case, the entire block of data may generally be conveyed from the L2 cache 120 to the L3 cache 122. However, in the case where data is being evicted from the L2 cache 120 and the F bit 416 of the data is not set, all of the sub-blocks of the block frame may not represent valid data. In such a case, the corresponding word mask 414 may be used to identify which sub-blocks are valid. Sub-block data conveyed from the L2 cache 120 as a result of the eviction may then be limited to only those sub-blocks which are identified as being valid. In this manner, the amount of data being conveyed by the L2 cache 120 may be reduced and the bandwidth at the L2 cache 120 boundary may be similarly reduced.

Figure 5:
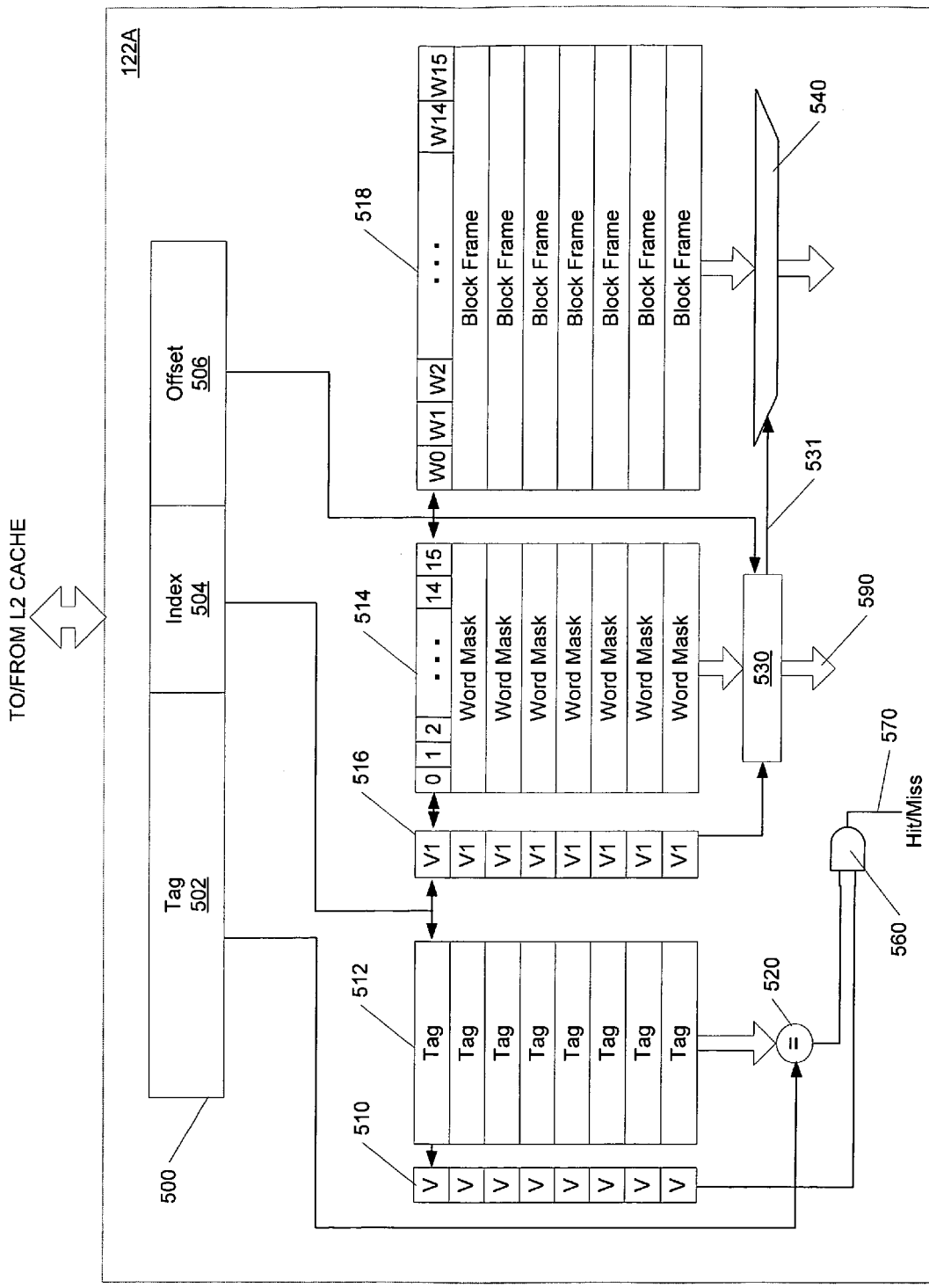
FIG. 5 is a block diagram illustrating one embodiment of a level 3 cache.

Turning now to FIG. 5, one embodiment of a portion of an L3 cache 122A as depicted in FIG. 1 is depicted. In the example shown, L3 cache 122A includes similar structures to those found in the L2 cache 120. Though it is to be understood that similarity of structures is not a requirement. FIG. 5 depicts an address 500 for use in accessing the L3 cache 122A. As in the example of FIG. 4, address 500 includes a Tag 502, Index 504, and Offset 506. Also depicted are a plurality of entries, each of which is configured to store a valid bit V 510, Tag 512, word mask 514, and block frame 518. In addition, associated with each entry is an additional valid bit V1 516 which is used to indicate whether the corresponding word mask 514 is to be utilized during a fetch of data from the L3 cache 122A.

During operation, when the L3 cache 122A is initially loaded with data from memory, or other storage lower in the cache hierarchy (e.g., a level 4 cache), and the loaded data does not include a valid word mask 514, the corresponding valid bit V1 516 may be cleared to indicate the word mask 514 is not valid. When the L3 cache 122A is accessed, an index 504 of the received address 500 may be used to select one of the entries. The tag 512 and valid bit V 510 of the selected entry may then be conveyed in order to determine whether Hit or a Miss has occurred. If the selected tag 512 matches the received tag 502, the output of a comparator 520 may be asserted. If comparator 520 indicates a match and the valid bit 510 is set, then logic AND gate 560 indicates a Hit.

Generally speaking, in one embodiment, L3 cache 122A always stores all sub-blocks for a given block within a block frame entry 518. The entire block which is selected may then be conveyed to a multiplexor 540. A control unit 530 is then utilized to generate a select signal 531 for the multiplexor 540. Select signal 531 may then select one or more of the sub-blocks for conveyance from the multiplexor 540. If the V1 bit 516 for a corresponding entry is cleared, then control unit 530 may be configured to convey a signal 531 which indicates the entire block is to be conveyed in response to the L3 cache 122A access. However, if the V1 bit 516 is set, then the corresponding word mask 514 is to be utilized in order to determine which sub-blocks are to be conveyed from the multiplexor 540.

As noted above, when the L3 cache 122A is first loaded, the V1 bit 516 may be cleared to indicate that the corresponding word mask 514 is not valid (i.e., does not represent valid prediction data) and is not to be used in an L3 cache 122A access. In one embodiment, when data is evicted from the L2 cache 120 to the L3 cache 122A, the word mask may also generally be conveyed from the L2 cache 120. As described in the discussion related to FIG. 4, the word mask data may have been modified during its residency in the L2 cache 120 to identify those words of a corresponding block which were accessed. When such data and corresponding word mask are evicted from the L2 cache 120 to the L3 cache 122A, the V1 bit 516 of the corresponding entry in the L3 cache 122A may be set to indicate that the word mask 514 represents valid data and may be utilized during an access to the corresponding entry.

In one embodiment, when an access to the L3 cache 122A is made and the V1 bit 516 of the selected entry is set, the word mask 514 is conveyed to control unit 530. Those bits of the selected word mask 514 which are set may then be used as a prediction as to which of the sub-blocks are likely to be accessed while the block data is resident in the L2 cache 120. A select signal 531 is then generated which causes only the predicted sub-blocks (i.e., the sub-blocks identified by the word mask) to be conveyed from the L3 cache 122A to the L2 cache 120. In this manner, the bandwidth between the L3 cache 122A and L2 cache 120 may be reduced. In one embodiment, control unit 530 is also coupled to receive the Offset 506 of the received address 506. If the Offset 506 identifies a particular sub-block which is not identified as a predicted sub-block by the corresponding word mask 514, the control unit 530 may cause the sub-block identified by the Offset 506 to be conveyed to the L2 cache 120 in addition to the predicted sub-blocks.

When block data 518 corresponding to an entry is conveyed from the L3 cache 122A to the L2 cache 120, the corresponding word mask 514 may also be conveyed to the L2 cache 120 via bus 590 where it is stored as described above. If the Offset 506 received by the L3 cache 122A identifies a previously unpredicted sub-block, the previously unpredicted sub-block may also be conveyed to the L2 cache 120. In addition, the control unit 530 may modify the word mask 514 which is conveyed to the L2 cache 120 to also identify the previously unpredicted sub-block. In general, the word mask 514 conveyed by the L3 cache 122A to the L2 cache 120 may serve to identify which of the sub-blocks of an addressed block are being conveyed from the L3 cache 122A to the L2 cache 120.

In one embodiment, L3 cache 122A may be configured to always convey word mask data 514 to the L2 cache 120 responsive to an access—irrespective of whether or not the word mask 514 includes valid data. Alternatively, the L3 cache 122A is conveying all sub-blocks of a given block, the L3 cache 122A may simply convey an indication that the entire block is valid (e.g., a valid block (VB) identifier). For example, the data conveyed from the L3 cache 122A to the L2 cache 120 may include a single bit which indicates whether the entire block is valid. In one embodiment, if either (i) the V1 bit 516 is set, or (ii) the V1 bit 516 is cleared, but all bits of the word mask 514 are set, the valid block VB identifier may be set and the word mask not conveyed to the L2 cache 120. It is noted that in the case of (ii), a valid word mask exists, but is not conveyed to the L2 cache 120. In such an embodiment, a further indication may be conveyed to the L2 cache 120 that a valid word mask exists but is not being conveyed. In response to such a further indication, the L2 cache 120 may determine that all bits of the word mask are set and set all of the bits in a corresponding word mask entry 414 in the L2 cache.

As noted, in one embodiment the data conveyed from the L3 cache 122A to the L2 cache 120 further includes an indication as to whether a corresponding word mask is valid. For example, the V1 bit 516 may be conveyed with the block data to the L2 cache 120. If the V1 bit 516 is set, the L2 cache may determine the corresponding word mask is valid. In an embodiment wherein the L3 cache 122A does not always convey a word mask 514 to the L2 cache 120, an additional bit may be used to indicate whether or not the word mask 514 is being conveyed. Numerous such alternatives are possible and are contemplated.

Figure 6:
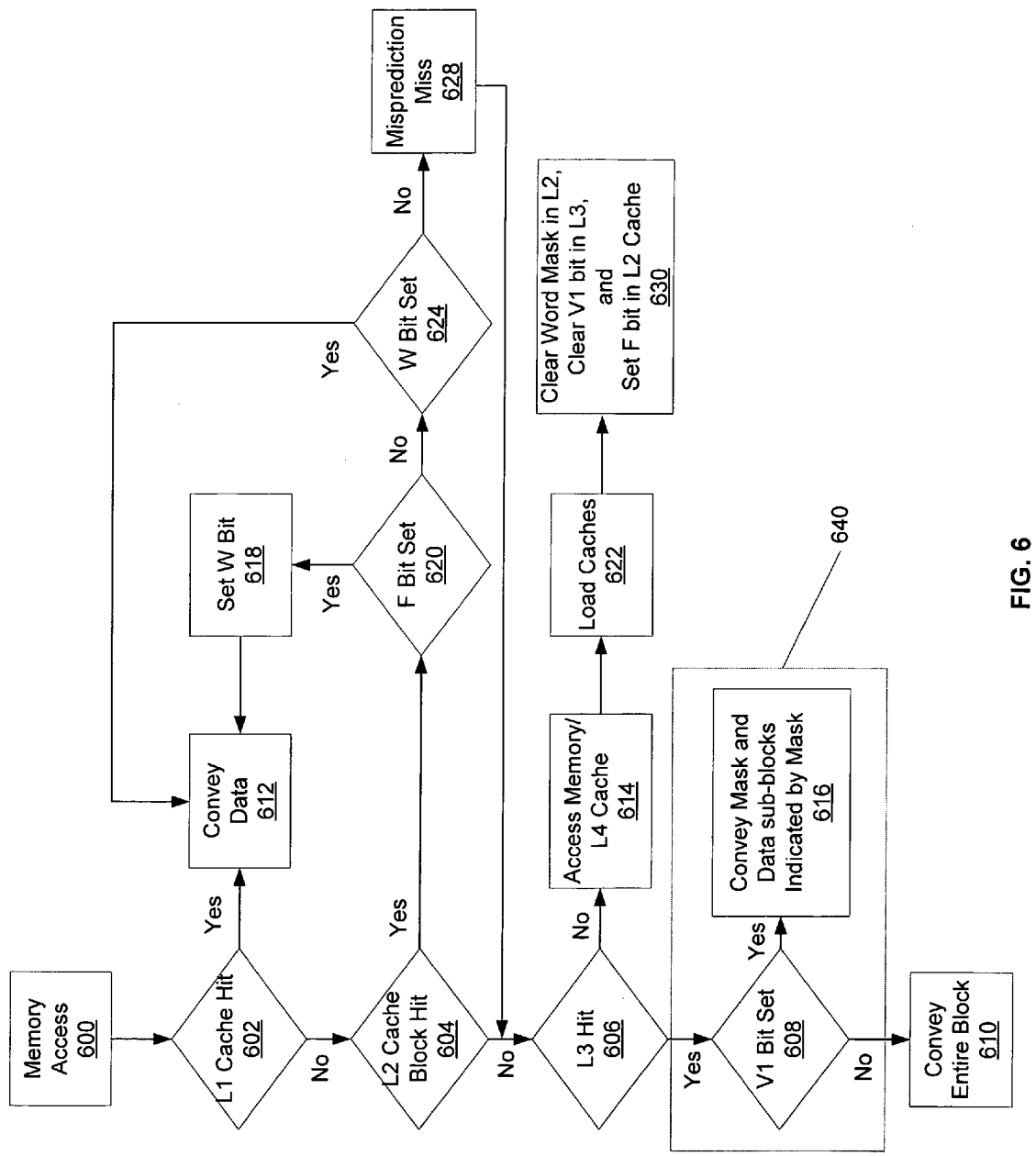
FIG. 6 depicts one embodiment of a method for managing cache accesses.

FIG. 6 depicts one embodiment of a method for performing cache accesses. In the embodiment shown, a memory access is initiated (block 600), and a determination is made as to whether the corresponding data is present in an L1 cache (decision block 602). If the data is present in the L1 cache, the data may simply be retrieved from the L1 cache for conveyance from the requestor (block 612). If, however, the data is not present in the L1 cache (decision block 602), a determination may be made as to whether the corresponding data is present in an L2 cache (decision block 604). If a hit to the addressed block is detected in the L2 cache, then the "F" bit corresponding to the selected entry is checked (decision block 620). If the "F" bit is set (indicating a training mode for the corresponding entry, and also indicating that all sub-blocks of the corresponding entry are valid), then a bit of the word mask which corresponds to the word being accessed is set (block 618), and the data may be conveyed (block 612). However, if the "F" bit is not set (decision block 620), then all of the sub-blocks of the addressed block may not be present in the L2 cache and the word mask is used to determine whether the sub-block being addressed is present. If the word mask indicates the particular sub-block is present (decision block 624), then the addressed data is conveyed. However, if the word mask indicates the addressed word is not present, then a (misprediction) miss is indicated (block 628).

If a miss in the L2 cache is detected (decision block 604), a determination may be made as to whether the data is present in an L3 cache (decision block 606). If it is determined that the data is present in the L3 cache and the corresponding V1 bit is set to indicate the presence of a valid word mask (decision block 608), the sub-blocks identified by the valid word mask are conveyed to the L2 cache (block 616). In addition, the corresponding word mask may also be conveyed to the L2 cache (block 616). As noted above, various alternative embodiments may not convey a valid word mask to the L2 cache if all of the bits of the word mask are set. In such an embodiment, the data conveyed to the L2 cache may include an indication that a valid word mask exists, but is not being conveyed. An alternative to the steps shown in block 640 may be utilized and will be discussed in FIG. 7. If it is determined the data is present in the L3 cache (decision block 606) and the V1 bit is not set (decision block 608), the entire block may be conveyed to the L2 cache.

Returning to decision block 606, if an L3 cache miss is detected, a lower level in the memory/cache hierarchy may be accessed (block 614). Responsive to the access, the data may be retrieved and the caches loaded with the retrieved data (block 622). When the data is loaded in the L2 cache, the corresponding word mask is cleared and the "F" bit is set to indicate a training mode. For the corresponding data loaded into the L3 cache, the V1 bit may be cleared to indicate that the word mask entry in the L3 cache does not currently store valid data.

Figure 7:
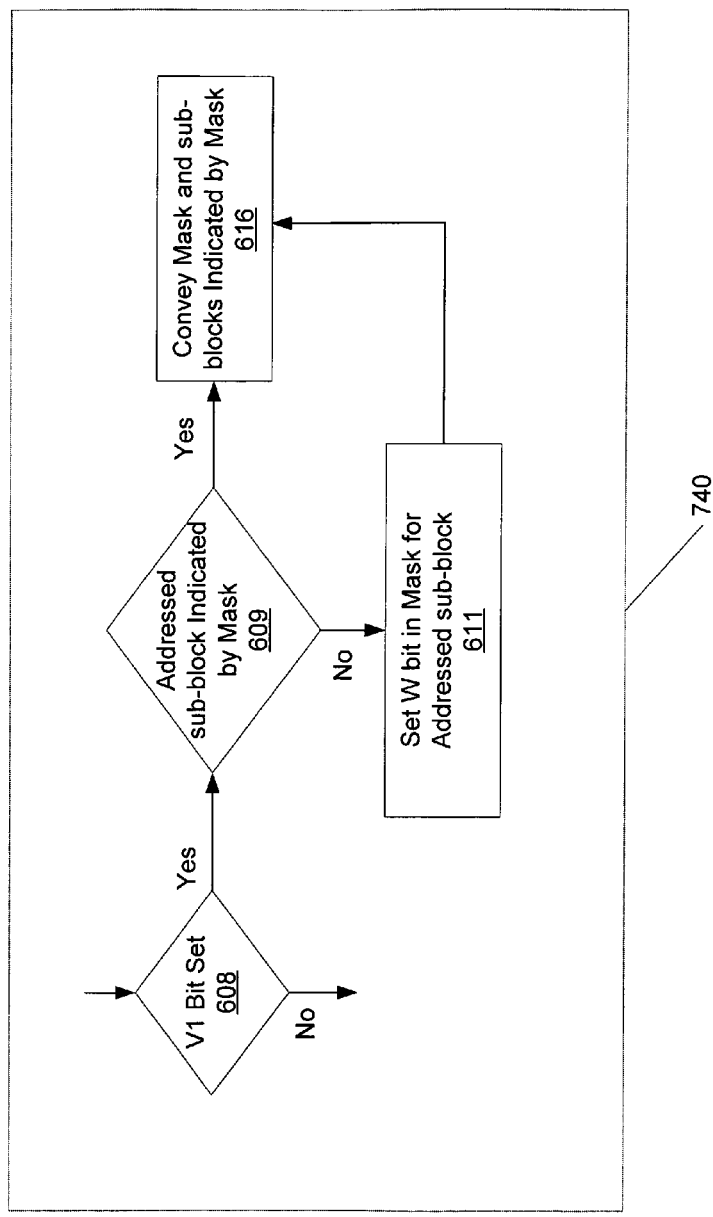
FIG. 7 illustrates an alternative embodiment of a method for managing cache accesses.

As mentioned above, an alternative approach to the blocks identified by block 640 may be used. FIG. 7 illustrates a block 740 which may substitute for block 640 in FIG. 6. In FIG. 7, a same decision block 608 as that depicted in FIG. 6 is included. However, in this embodiment, if the V1 bit is set, a determination is made as to whether the particular sub-block addressed by the access is identified as a predicted sub-block (decision block 609). If so, then the corresponding word mask and identified sub-blocks may then be conveyed to the L2 cache (block 616). However, if the sub-block addressed by the access is not one identified by the word mask, then the bit in the word mask which corresponds to the sub-block being accessed is first set (block 611), and then the word mask and identified sub-blocks may then be conveyed to the L2 cache (block 616).

It is to be understood, that while the above description may describe particular events as occurring in a particular order, the events may in fact occur in an order other than that described. Further, various events may occur concurrently. Those skilled in the art will appreciate such alternatives. All such alternatives are contemplated. In addition, while a multi-core processor is used in the description above, the methods and mechanisms described herein may be utilized with any suitable processing devices, and may in general be used in any suitable hierarchical memory system.

What is claimed is:

1. A hierarchical memory system comprising:
a cache coupled to one or more processing cores, wherein the cache is configured to convey a request for a first sub-block within a first cache line comprising a plurality of sub-blocks of data;
a lower-level memory configured to store a cache line which is evicted from the cache;
wherein, in response to receiving said request, the lower-level memory is further configured to:
access a mask corresponding to the first cache line;
identify one or more sub-blocks within the first cache line which are predicted by the mask to be accessed; and
transfer to the cache only the first sub-block and said one or more sub-blocks;

wherein the cache, in response to detecting an access to a second cache line within the cache, is further configured to:
- identify a particular sub-block of the second cache line which is addressed by the access; and
- store an indication in an entry in a first mask which corresponds to the particular sub-block, wherein the first mask comprises a separate entry for each of the sub-blocks within the second cache line, said indication comprising a prediction that the sub-block is likely to be accessed while the second cache line is present in the cache;

wherein in response to determining a selected cache line stored within the cache is to be evicted, the cache is further configured to access a selected word mask corresponding to the selected cache line prior to evicting the selected cache line, and then transfer to the lower-level memory only those sub-blocks of the selected cache line which are identified by the selected word mask as being predicted likely to be accessed.

2. The memory system of claim 1, wherein the cache is configured to store said indication in the first mask in response to detecting a training mode corresponding to the second cache line.

3. The memory system as recited in claim 2, wherein the lower-level memory is further configured to transfer to the cache said one or more sub-blocks, in response to determining said mask comprises a valid prediction.

4. The memory system of claim 2, wherein in response to detecting an access to a third cache line in the cache, the cache is further configured to:
- determine whether a training mode is indicated for the third cache line; and
- in response to determining a training mode is not indicated for the third cache line:
  - access a third mask corresponding to the third cache line in order to determine whether a valid sub-block addressed by the access to the third cache line is present in the cache; and
  - indicate a cache miss, in response to determining a valid sub-block addressed by the access to the third cache line is not present in the cache.

5. The memory system of claim 1, wherein each sub-block comprises a word size of a processor, and wherein each cache line comprises multiple words.

6. A method in a hierarchical memory system comprising:
- conveying a request from a cache for a first sub-block within a first cache line comprising a plurality of sub-blocks of data;
- accessing a mask corresponding to the first cache line, in response to receiving said request;
- identifying one or more sub-blocks of the cache line which are predicted by the mask to be accessed; and
- transferring to the cache only the first sub-block and said one or more sub-blocks;

wherein in response to detecting an access to a second cache line within the cache, the method further comprises:
- identifying a particular sub-block of the second cache line which is addressed by the access; and
- storing an indication in an entry in a first mask which corresponds to the particular sub-block, wherein the mask comprises a separate entry for each of the sub-blocks within the second cache line, said indication comprising a prediction that the sub-block is likely to be accessed while the second cache line is present in the cache;

wherein in response to determining a selected cache line stored within the cache is to be evicted, the method further comprises:
- accessing a selected word mask corresponding to the selected cache line prior to evicting the selected cache line; and then
- transferring to a lower-level memory only those sub-blocks of the selected cache line which are identified by the selected word mask as being predicted likely to be accessed.

7. The method of claim 6, wherein storing said indication in the first mask is in further response to detecting a training mode corresponding to the second cache line.

8. The method as recited in claim 7, wherein transferring to the cache said one or more sub-blocks is in further response to determining said mask comprises a valid prediction.

9. The method of claim 7, wherein in response to detecting an access to a third cache line in the cache, the method further comprises the cache determining whether a training mode is indicated for the third cache line, and in response to determining a training mode is not indicated for the third cache line:
- accessing a third mask corresponding to the third cache line in order to determine whether a valid sub-block addressed by the access to the third cache line is present in the cache; and
- indicating a cache miss, in response to determining a valid sub-block addressed by the access to the third cache line is not present in the cache.

10. The method of claim 6, wherein each sub-block comprises a word size of a processor, and wherein each cache line comprises multiple words.

11. A computing system comprising:
- a main memory;
- a processing unit comprising a cache located between one or more processing cores and the main memory, wherein the cache is configured to convey a request for a first sub-block within a first cache line comprising a plurality of sub-blocks of data;
- a lower-level memory, coupled to the processing unit, configured to store a cache line which is evicted from the first cache;

wherein, in response to receiving said request, the lower-level memory is further configured to:
- access a mask corresponding to the first cache line;
- identify one or more sub-blocks within the first cache line which are predicted by the mask to be accessed; and
- transfer to the cache only the first sub-block and said one or more sub-blocks;

wherein the cache, in response to detecting an access to a second cache line within the cache, is further configured to:
- identify a particular sub-block of the second cache line which is addressed by the access; and
- store an indication in an entry in a first mask which corresponds to the particular sub-block, wherein the first mask comprises a separate entry for each of the sub-blocks within the second cache line, said indication comprising a prediction that the sub-block is likely to be accessed while the second cache line is present in the cache;

wherein in response to determining a selected cache line stored within the cache is to be evicted, the cache is further configured to access a selected word mask corresponding to the selected cache line prior to evicting the selected cache line, and then transfer to the lower-level memory only those sub-blocks of the selected cache line which are identified by the selected word mask as being predicted likely to be accessed.

12. The computing system of claim 11, wherein the cache is configured to store said indication in the first mask in response to detecting a training mode corresponding to the second cache line.

13. The computing system as recited in claim 12, wherein the lower-level memory is further configured to transfer to the cache said one or more blocks, in response to determining said mask comprises a valid prediction.

14. The computing system of claim 12, wherein in response to detecting an access to a third cache line in the cache, the cache is further configured to:

determine whether a training mode is indicated for the third cache line; and in response to determining a training mode is not indicated for the third cache line:

access a third mask corresponding to the third cache line in order to determine whether a valid sub-block addressed by the access to the third cache line is present in the cache; and indicate a cache miss, in response to determining a valid sub-block addressed by the access to the third cache line is not present in the cache.

15. The memory system of claim 1, wherein said access comprises a read access.

\* \* \* \* \*